(12) United States Patent
D'Souza-Mathew et al.

(10) Patent No.: US 10,852,168 B2
(45) Date of Patent: Dec. 1, 2020

(54) METHOD OF MEASURING TIME OF FLIGHT OF AN ULTRASOUND PULSE

(71) Applicant: PCME LIMITED, St Ives (GB)

(72) Inventors: Neil D'Souza-Mathew, Cambridge (GB); Robert Fryers, Bedford (GB); Roger Millington, Huntingdon (GB); David Unitt, Cambridge (GB)

(73) Assignee: PCME LIMITED, Cambridgeshire (GB)

( * ) Notice: Subject to any disclaimer, the term of this patent is extended or adjusted under 35 U.S.C. 154(b) by 550 days.

(21) Appl. No.: 15/322,456

(22) PCT Filed: Jun. 29, 2015

(86) PCT No.: PCT/GB2015/051890
§ 371 (c)(1),
(2) Date: Dec. 28, 2016

(87) PCT Pub. No.: WO2016/001638
PCT Pub. Date: Jan. 7, 2016

(65) Prior Publication Data
US 2017/0138773 A1 May 18, 2017

(30) Foreign Application Priority Data
Jul. 1, 2014 (GB) .................. 1411701.4

(51) Int. Cl.
*G01F 1/66* (2006.01)
*G01P 5/24* (2006.01)
*G01F 23/296* (2006.01)

(52) U.S. Cl.
CPC .............. *G01F 1/667* (2013.01); *G01F 1/662* (2013.01); *G01P 5/248* (2013.01); *G01F 23/2962* (2013.01)

(58) Field of Classification Search
CPC ...... G01F 1/667; G01F 1/662; G01F 23/2962; G01P 5/248
(Continued)

(56) References Cited

U.S. PATENT DOCUMENTS 4,545,244 A * 10/1985 Yasuda .................. G01F 1/663
73/195
4,787,252 A 11/1988 Jacobson et al.
(Continued)

FOREIGN PATENT DOCUMENTS

DE 4336370 C1 2/1995
DE 102012212901 A1 * 1/2014
(Continued)

OTHER PUBLICATIONS

Search Report issued in corresponding UK Patent Application No. GB1411701.4 dated Dec. 16, 2014 (4 pages).
(Continued)

*Primary Examiner* — Alexander Satanovsky
*Assistant Examiner* — Douglas Kay
(74) *Attorney, Agent, or Firm* — Kilyk & Bowersox, P.L.L.C.

(57) ABSTRACT

Method and apparatus relating to ultrasound flow probes Measurement of time of flight of ultrasound pulses comprises: transmitting the pulses across a fluid flow; detecting a waveform (200) of the pulses, generating a cross-correlation between the waveform (200) and a tone (210) and identifying a plurality of peaks (220) in the cross-correlation; fitting a curve template (310) to the waveform at locations (300) corresponding to the peaks (220) and identifying the location (330) of the minimum error; performing a further cross-correlation (420) between the waveform (200) and the tone (210) over only a portion of the waveform (200) containing the minimum error location (330); and
(Continued)

determining the temporal location corresponding to the maximum (430) of the further cross-correlation (430).

16 Claims, 2 Drawing Sheets

(58) Field of Classification Search
USPC .......................................................... 702/176
See application file for complete search history.

(56) References Cited

U.S. PATENT DOCUMENTS

| | | | |
|---|---|---|---|
| 5,650,572 A | | 7/1997 | Vontz |
| 5,818,735 A * | | 10/1998 | Tigwell .................. G04F 10/00 |
| | | | 702/176 |
| 8,439,842 B2 * | | 5/2013 | Kabakov .................. A61B 8/02 |
| | | | 600/437 |
| 9,080,529 B1 * | | 7/2015 | Klughart ............. F02D 41/2467 |
| 2007/0113677 A1 * | | 5/2007 | Gaugler .................. G01F 1/667 |
| | | | 73/861.21 |
| 2008/0055615 A1 * | | 3/2008 | Mitchell .................. H04N 1/64 |
| | | | 358/1.9 |
| 2013/0123591 A1 * | | 5/2013 | Naganuma ........... A61B 5/0095 |
| | | | 600/316 |
| 2014/0012518 A1 | | 1/2014 | Ramamurthy et al. |
| 2014/0070942 A1 * | | 3/2014 | Haase .................... G08B 21/02 |
| | | | 340/532 |
| 2016/0098612 A1 * | | 4/2016 | Viviani .............. G06K 9/00744 |
| | | | 382/103 |
| 2017/0248454 A1 * | | 8/2017 | Millington .............. G01F 1/662 |

FOREIGN PATENT DOCUMENTS

| | | | | |
|---|---|---|---|---|
| DE | 102012212901 A1 | | 1/2014 | |
| EP | 0333184 A1 * | | 9/1989 | ............. B61L 29/08 |
| EP | 0797105 A2 | | 9/1997 | |
| EP | 1113247 A1 | | 7/2001 | |
| EP | 0797105 B1 * | | 8/2004 | ............. G01F 1/667 |
| GB | 2327761 A | | 2/1999 | |
| WO | 9749010 A1 | | 12/1997 | |
| WO | WO-9749010 A1 * | | 12/1997 | ............. G04F 10/00 |
| WO | 2013079074 A1 | | 6/2013 | |
| WO | 2014016159 A1 | | 1/2014 | |

OTHER PUBLICATIONS

International Search Report and Written Opinion issued in corresponding International Patent Application No. PCT/GB2015/051890 dated Jun. 29, 2015 (12 pages).

* cited by examiner

METHOD OF MEASURING TIME OF FLIGHT OF AN ULTRASOUND PULSE

This application is a National Stage Application of PCT/GB2015/051890, filed Jun. 29, 2015, which claims priority to United Kingdom Patent Application No. 1411701.4, filed Jul. 1, 2014, which is incorporated in its entirety by reference herein.

FIELD OF THE INVENTION

The present invention concerns an ultrasound flow probe and methods of monitoring fluid flow using ultrasound pulses. More particularly, but not exclusively, this invention concerns a method of measuring time of flight of ultrasound pulses in a fluid flow, a method of measuring the flow velocity of a fluid flowing in a conduit, for example a stack, an ultrasound flow probe for measuring the flow velocity of a fluid flowing in a conduit, and a stack including an ultrasound flow probe.

BACKGROUND OF THE INVENTION

It is often desirable to know the characteristics of fluid flow in a conduit, for example a stack. That may be, for example, due to a regulatory requirement to monitor emissions or a desire to improve the efficiency of an industrial process. Characteristics of fluid flow being measured can include: the average velocity of the fluid, the velocity profile of the fluid, and/or any departure from laminar flow within the fluid.

There is a variety of techniques for measuring fluid flow in a conduit, including optical methods, electrical methods and ultrasonic methods. In a typical ultrasonic method, an ultrasound flow probe includes transducers that emit and receive contra-propagating ultrasonic waves along a path that passes through the fluid flow and has a component parallel to it, i.e. the path is such that a wave travelling from a first of a pair of the transducers to a second of the pair of the transducers travels a distance upstream or downstream in the fluid flow, and a wave travelling from the second of the pair of the transducers to the first of the pair of the transducers travels a distance downstream or upstream in the fluid flow. The flow of the fluid results in a difference between the times taken for the wave travelling upstream in the flow and the wave travelling downstream in the flow to pass between the transducers. That difference between the travel times for the two counter-propagating waves is related to the average velocity of the fluid along the path between the transducers.

Thus, fluid-flow sensors using time-of-flight measurements of ultrasound pulses typically comprise a pair of transducers, pointing towards each other, one initially acting as the source of ultrasound whilst the other detects the ultrasound. The waveform of the detected ultrasound pulse is stored and then the roles of the transducers are reversed, so that a waveform is stored from ultrasound that has travelled in the opposite or counter-propagating direction. The waveforms for a pair of counter-propagated pulses provide a time of flight for each of the pair. As explained above, times of flight are modified by the speed of flow of any fluid flowing between the transducers, i.e. the average velocity vector for the pulse has an additional component parallel to the direction of the flow. The time of flight of one waveform of the pair is lengthened by the fluid flow acting against the direction of the ultrasound whereas the time of flight of the other waveform is shortened by the fluid flow acting in the same direction. Analysis of the two times of flight using well-known methods results in a measurement of the velocity of the fluid (i.e. the fluid flow), independent of the actual speed of sound in the fluid.

Accuracy of the determination of time of flight is critical in achieving an accurate measurement of flow velocity. However, in many industrial environments, and especially in stacks, the practical utility of any flow measurement technique depends upon its ability to continue to work when stack conditions become variable or difficult, for example when there is a temperature change, turbulent flow, contamination of the probe, condensation or high fluid velocity.

U.S. Pat. No. 5,804,739 (Erwin Sick GmbH Optik-Elektronik) describes a method of determining the time point of the start of an ultrasonic pulse by determining the times corresponding to at least two points of the envelope curve of the pulse with respect to an arbitrary zero time point. Of those two points, one is a characteristic point of the envelope curve (in particular, a point of inflection) and the other has an amplitude equal to a predetermined fraction of the amplitude at the characteristic envelope curve point. The technique relies on specific pre-selected reference points on the envelope of the waveform, and as such can be termed a feature-based approach.

U.S. Pat. No. 6,305,233 (Commonwealth Scientific and Industrial Research Organisation et al.) describes a method and device which determines time of flight from digital waveforms using linear regressions. The waveforms are digitised and waveform features are identified by comparison with a standard template of the waveform. The position in time of these features is then determined with respect to a high-speed clock. The results are then used in a weighted computation to determine the time of arrival of the waveform at a transducer.

WO2013079074A1 (Kamstrup A/S) describes a method of operating an ultrasonic flow meter to measure a flow rate of a fluid, the method including using at least two digitized under-sampled signals from counter-propagating ultrasound pulses in a correlation or a determination of the phase-shifts between the signals. However, the technique is dependent on an unchanging medium which would be expected to render the measurement inaccurate in harsh environments, for example those encountered in stacks.

WO1997049010 (PEEK Measurement) describes a method and system for measuring flow rate that uses a two-stage measurement method. First, a complex, broadband ultrasound pulse having a low time-domain ambiguity and a sharp auto-correlation function is generated. This pulse is transmitted multiple times in both the upstream and downstream directions and the received samples on each side are numerically averaged. A cross-correlation is performed on the averaged data, and the differential transit time is found by noting the location of the central peak of the correlation. Second, a much longer sinusoidal pulse sequence with a centre frequency of exactly 1.00 MHz is generated. This pulse has a flat autocorrelation, large time domain ambiguity, and very low frequency (and phase) ambiguity. This pulse is transmitted upstream and downstream and digitized and averaged in the same manner as the broadband pulse. Next, a partial Fourier transform beginning at an arbitrary point is performed on one of the data sets generated from the second pulse. The scalar component of the centre frequency vector is discarded, but the phase component is saved. Next, the other data set is shifted by an interval corresponding to the differential time of transit measured by the cross-correlation between the upstream and downstream signals. Then, an identical Fourier transformation is performed on the shifted data set and the phase component is retained. One of the phase values is then subtracted from the other, thereby yielding a phase difference. The phase difference is converted to time and summed with the differential time measured with the cross-correlation between the upstream and downstream signals. This sum is the total differential transit time, measured to a resolution dependent upon the A/D converter resolution, the number of points in the transform, and only indirectly related to the sampling rate. The method described in this prior-art document is complex and computationally demanding.

The present invention seeks to mitigate the above-mentioned problems. Alternatively or additionally, the present invention seeks to provide an improved apparatus and method relating to ultrasonic flow probes.

SUMMARY OF THE INVENTION

The present invention provides, according to a first aspect, a method of measuring time of flight of a pulse of ultrasound in a fluid flow, the pulse having an ultrasonic frequency, the method comprising:

(1) transmitting the ultrasound pulse across the fluid flow;

(2) detecting the ultrasound pulse after transmission, the detected pulse being a waveform, generating a cross-correlation between the waveform and a tone at the ultrasonic frequency, and identifying a plurality of peaks in the cross-correlation;

(3) fitting a curve template to the waveform at temporal locations corresponding to the peaks in the cross-correlation and identifying the temporal location in the waveform of the minimum error of the fit;

(4) performing a further cross-correlation between the waveform and the tone, the further cross-correlation being carried out over only a portion of the waveform, the portion containing the temporal location corresponding to the minimum error of the fit; and (5) determining the temporal location in the waveform corresponding to the maximum of the further cross-correlation and thereby obtaining a measurement of the time of flight of the pulses.

The present invention also provides, according to a second aspect, a method of measuring the flow velocity of a fluid flowing in a conduit, the method comprising:

(a) transmitting, a first ultrasound pulse across the fluid flow from an upstream position and detecting it at a downstream position;

(b) transmitting, a second ultrasound pulse across the fluid flow from the downstream position and detecting it at the upstream position;

(c) obtaining a measurement of the time of flight of the first pulse by steps (2) to (5) of the method according to the first aspect of the invention;

(d) obtaining a measurement of the time of flight of the second pulse by steps (2) to (5) of the method according to the first aspect of the invention; and (e) calculating the flow velocity using the measurements of the times of flight of the first and second pulses.

The present invention also provides, according to a third aspect, an ultrasound flow probe for measuring the flow velocity of a fluid flowing in a conduit, the probe comprising:

(i) a pulse transmitter for transmitting, from an upstream position, across the fluid flow, a first ultrasound pulse, the first ultrasound pulse having an ultrasound frequency;

(ii) a detector for detecting the first ultrasound pulse at a downstream position, the detected pulse being a waveform;

(iii) a pulse transmitter for transmitting, from the downstream position, across the fluid flow, a second ultrasound pulse, the second ultrasound pulse having a waveform having an ultrasound frequency and a rising edge;

(iv) a detector for detecting the second pulse at the upstream position, the detected pulse being a waveform; and (v) a processing unit configured to, for the first and second pulses:

(A) generate a cross-correlation between the waveform of the detected pulse and a tone at the ultrasonic frequency and identify a plurality of peaks in the cross-correlation;

(B) fit a curve template to the waveform at temporal locations corresponding to the peaks in the cross-correlation and identify the temporal location in the waveform of the minimum error of the fit;

(C) perform a further cross-correlation between the waveform and the tone, the further cross-correlation being carried out over only a portion of the waveform, the portion containing the temporal location corresponding to the minimum error of the fit; and (D) determine the temporal location in the waveform corresponding to the maximum of the further cross-correlation and thereby obtain a measurement of the time of flight of the pulse; and (E) calculate the flow velocity using the measurements of the times of flight of the first and second pulses.

The present invention also provides, according to a fourth aspect, a stack including an ultrasound flow probe according to the third aspect of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

In one aspect, the invention provides a method of measuring time of flight of a pulse of ultrasound in a fluid flow. The pulse has an ultrasonic frequency. The ultrasound pulse is transmitted across the fluid flow. The ultrasound pulse is detected after transmission, the detected pulse being a waveform. A cross-correlation between the waveform and a tone at the ultrasonic frequency is generated and a plurality of peaks in the cross-correlation are identified. A curve template is fitted to the waveform at temporal locations corresponding to the peaks in the cross-correlation. The temporal location in the waveform of the minimum error of the fit is identified. A further cross-correlation between the waveform and the tone is performed, the further cross-correlation being carried out over only a portion of the waveform, the portion containing the temporal location corresponding to the minimum error of the fit. The temporal location in the waveform corresponding to the maximum of the further cross-correlation is determined and a measurement of the time of flight of the pulses is thereby obtained.

The second aspect of the invention provides a method of measuring the flow velocity of a fluid flowing in a conduit. A first ultrasound pulse is transmitted across the fluid flow from an upstream position and detected at a downstream position. A second ultrasound pulse is transmitted across the fluid flow from the downstream position and detected at the upstream position. A measurement of the time of flight of the first pulse is obtained by steps (2) to (5) of the method according to the first aspect of the invention. A measurement of the time of flight of the second pulse is obtained by steps (2) to (5) of the method according to the first aspect of the invention. The flow velocity is calculated using the measurements of the times of flight of the first and second pulses.

The third aspect of the invention provides an ultrasound flow probe for measuring the flow velocity of a fluid flowing in a conduit. The ultrasound flow probe comprises: a pulse transmitter for transmitting, from an upstream position, across the fluid flow, a first ultrasound pulse, the first ultrasound pulse having an ultrasound frequency; a detector for detecting the first ultrasound pulse at a downstream position, the detected pulse being a waveform; a pulse transmitter for transmitting, from the downstream position, across the fluid flow, a second ultrasound pulse, the second ultrasound pulse having an ultrasound frequency and a rising edge; a detector for detecting the second pulse at the upstream position, the detected pulse being a waveform; and a processing unit. The processing unit is configured to, for the first and second pulses, generate a cross-correlation between the waveform of the detected pulses and a tone at the ultrasonic frequency and identify a plurality of peaks in the cross-correlation; fit a curve template to the waveform at temporal locations corresponding to the peaks in the cross-correlation and identify the temporal location in the waveform of the minimum error of the fit; perform a further cross-correlation between the waveform and the tone, the further cross-correlation being carried out over only a portion of the waveform, the portion containing the temporal location corresponding to the minimum error of the fit; determine the temporal location in the waveform corresponding to the maximum of the further cross-correlation and thereby obtain a measurement of the time of flight of the pulses; calculate the flow velocity using the measurements of the times of flight of the first and second pulses.

The waveform may have a rising edge. The rising edge of the waveform is the part of the waveform first detected after transmission, between the first increase of the waveform's envelope above background noise levels to the peak of the envelope. The cross-correlation between the waveform and the tone may be between a portion of the waveform and the tone. The portion may be or include the rising edge.

Ultrasound is sound having a frequency too high to be heard by a human; typically, ultrasound frequencies are taken to be greater than 20 kHz. The ultrasonic frequency can be, for example, in the range 90 kHz to 130 kHz. The pulse can be a tone, i.e. a sinusoid of the ultrasonic frequency. The pulse can have a duration within the rising edge of the waveform of the detected pulses. The pulse will typically be of at least one cycle in duration, for example it may be between 3 and 7, preferably between 4 and 6, cycles at the ultrasound frequency.

The ultrasonic frequency can be the resonant frequency of the transmitter and/or the detector.

A plurality of pulses may be generated to produce train of pulses.

In use, the upstream position and the downstream position may be, for example, between 10 cm and 70 cm apart, preferably between 30 cm and 50 cm apart, for example about 40 cm apart, in the direction of fluid flow. The upstream position and the downstream position may be, for example, more than 10 cm apart, more than 30 cm apart, more than 40 cm apart, more than 50 cm apart, more than 50 cm apart, more than 70 cm apart, more than 1 m apart, or even more than 2 meters apart, in the direction perpendicular to the direction of fluid flow. When the ultrasound flow probe is installed in a stack, the separation, in the direction perpendicular to the direction of fluid flow, of the upstream position and the downstream position will generally be determined by the width of the stack.

The pulse transmitter for transmitting the first ultrasound pulse and the detector for detecting the second ultrasound pulse may be provided as a common module, for example they may be or comprise a transducer configured to operate alternately as the pulse transmitter and the detector. In the same way, the pulse transmitter for transmitting the second ultrasound pulse and the detector for detecting the first ultrasound pulse may be provided as a common module, for example they may be or comprise a transducer configured to operate alternately as the pulse transmitter and the detector. The pulse transmitter for transmitting the first ultrasound pulse and the detector for detecting the second ultrasound pulse, and/or the pulse transmitter for transmitting the second ultrasound pulse and the detector for detecting the first ultrasound pulse, may comprise: a transducer for generating and detecting pulses, a driver to drive the transducer to generate the pulses, an amplifier to amplify a detection signal when the transducer detects the pulses, and a switch to switch between pulse generation and pulse detection modes of operation. The driver may drive the transducer via a transformer.

The conduit may be a stack. A stack is a chimney. Stacks are particularly challenging environments for measurement probes, as they often contain gases or other fluids that create extreme conditions, for example very high temperature, very corrosive and/or very dirty conditions. Moreover, measurement can be further complicated by large fluctuations in the conditions, e.g. large temperature fluctuations, which can affect the calibration of measurement devices.

Noise is any disturbance which distorts or obscures part or whole of the waveform, particularly the envelope of the waveform.

The fluid may be gas or liquid. The fluid may include particulates. The fluid may be or include industrial effluent, for example exhaust gases from an industrial process.

The curve template may be a waveform with a pre-defined curve envelope. It may be that the temporal locations corresponding to the peaks in the cross-correlation are equally spaced (allowing for any noise and any distortion on the signal, if necessary) by an interval, and the fitting comprises repeatedly shifting the curve template relative to the waveform by the interval, the best fit being the number of shifts at which the minimum error of an error function occurs, so that the corresponding known temporal location of the template provides an identification of the temporal location of the minimum error of the fit in the waveform.

The tone used in the cross-correlation may be at the ultrasonic frequency of the transmitted pulses.

The curve-fitting may be an Lp-norm curve-fitting process, for example the method of least squares.

The curve template may be chosen from a set of curve templates in response to environmental, for example stack, disturbances. For example, the signal-to-noise ratio of the detected waveform may be monitored and, when a predetermined threshold is not achieved, the template changed automatically for one which provides a higher signal-to-noise ratio under those operating conditions. The curve template may be a sinusoid with an envelope that increases linearly; a linear template works well in less-demanding stack situations. The curve template may be a sinusoid with an envelope that increases in an S-curve (i.e. the envelope has a gradient that increases to point of inflection and then decreases again); an S-curve template suits more demanding stacks, e.g. where there is high stack gas velocity, contamination or high temperature.

The portion of the waveform containing the temporal location corresponding to the minimum error of the curve fit, i.e. the portion of the waveform upon which the further cross correlation is carried out, may be less than 50%, less than 40%, less than 30%, less than 20% or less than 10% of the waveform. For example, the region of interest can be defined by finding the peak of the waveform envelope and working back by more than 10, for example about 15 or more, cycles of the ultrasonic frequency.

The further cross-correlation between the waveform and the tone can comprise phase-shifting the tone in steps across the waveform. Thus method may include carrying out a plurality of steps of the further cross-correlation, the tone in each successive cross-correlation being phase-shifted relative to its position in the preceding cross-correlation. It may be that there are 20 to 60 phase shifts in the further cross-correlation, preferably 30 to 50 phase shifts, for example 40 phase shifts. It may the steps are a small fraction of a cycle of the ultrasound waveform, for example less than ¼ of a cycle or less than ⅛ of a cycle.

The further cross-correlation may be centered on the temporal location of the minimum error of the curve fit. The portion of the waveform may be or include the temporal locations in the waveform corresponding to the peaks in the (first) cross-correlation.

In each step of the further cross-correlation, the template tone may be multiplied with the portion of the waveform, with a phase shift.

The identifying of the temporal location, in the waveform of the minimum error of the fit, is to a resolution, and it may be that the phase-shift is smaller than said resolution. The phase-shift may be smaller than a resolution of an analogue-to-digital converter used to obtain the waveform in digital form.

The received waveform may have a first spacing between its data points and the tone may have a second, different spacing between its data points.

It may be that the further cross-correlation, between the received waveform and the tone, uses all data points in the waveform (or in the portion of the waveform) but only those data points in the tone that are in the same position as data points in the received waveform.

It may be that, on each step of the cross-correlation, the tone is shifted by of its one data points.

The ultrasound pulse may be generated with a power selected to provide a signal-to-noise ratio in the waveform that exceeds a selected minimum ratio. The power may be altered, preferably automatically, in order to match the range of the detector detecting the pulse. Systematic disturbances can alter the transmission and reception characteristics of successive pulses and so it may be desirable to alter the power dynamically in order to match the range of the detector.

The ultrasonic drive frequency may be selected dynamically, for example to optimise the signal-to-noise ratio of the detected waveform and/or to optimise power efficiency in the transmission/detection cycle.

The shape of the transmitted pulses may be changed during the method to optimise transmission and detection characteristics (e.g. signal-to-noise ratio) of the probe, for example by matching to driven and/or resonant modes in the probe or to reduce interference from ringing in the detector.

The waveforms from a plurality of the pulses may be averaged to build up an average waveform, and the steps may then be carried out on the average waveform. The number of pulses used to build up the average waveform may be chosen to optimise the detected signal-to-noise ratio.

The waveform may be detected with an analogue gain selected to exceed a selected signal-to-noise ratio.

The waveform may be stored, for example in digital form.

Thus the invention provides a shape-based rather than a feature-based approach to measurement. The fitting of the curve template to the waveform means that the quality of the waveform is monitored against a stored standard.

Prior-art methods that attempt to use curve-fitting applied to complete waveforms, but with sufficient sampling to exceed the Nyquist limit, are computationally intensive. In the present invention, the first cross-correlation reduces the waveform to the set of peaks. That provides a smaller set of data for the curve-fitting step.

An example ultrasound flow probe 10 according to a first example embodiment of the invention (FIG. 1) includes the following basic functional parts. A processor 20 controls a first transmitter/detector module 30*a* and a second transmitter/detector module 30*b*. Each transmitter/detector module 30*a,b* includes a transducer 40*a,b* for generating and detecting ultrasound pulses, a driver 50*a,b* for driving the transducer 40*a,b* to generate the pulses, an amplifier 60*a,b* for amplifying signals resulting from detection of ultrasound pulses by the transducer 40*a,b* and a switch 70*a,b* for switching the transducer 40*a,b* between generation and detection modes of operation. A transformer 80*a,b* converts the output of the driver 50*a,b* to a voltage suitable for driving the transducer 40*a,b*.

Figure 1:
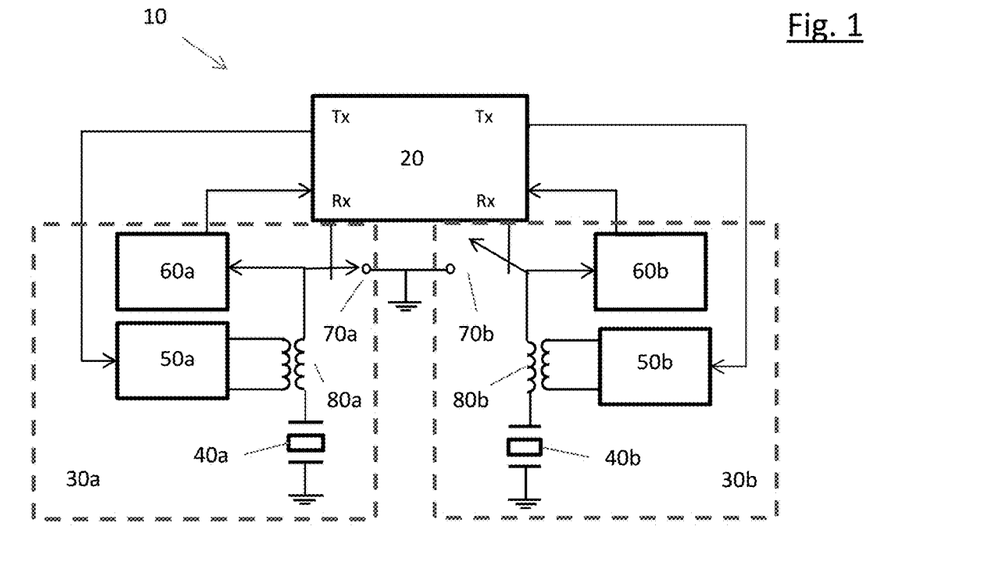
FIG. 1 is a block diagram of an ultrasound flow probe according to a first embodiment of the invention.

In this example, the transducers 40*a,b* are identical and are configured to generate pulses of ultrasound of 4 to 6 cycles duration. The pulses are transmitted at a frequency chosen to be the resonant frequency of the transducers 40*a,b*.

The case in which the first transmitter/detector module 30*a* is generating ultrasound pulses and the second transmitter/detector module 30*b* is detecting them will now be described. The switch 70*a* of the first transmitter/detector module 30*a* is closed, shorting any signal between the transducer 40*a* and the amplifier 60*a* to ground. A transmission signal Tx corresponding to the ultrasound waveform to be transmitted is transmitted by the processor 20 to the driver 50*a*, which in turn provides a voltage waveform to the transducer 40*a* via the transformer 80*a*. The transducer 40*a* converts the applied waveform into an ultrasound pulse having a pulse envelope corresponding to the specified waveform.

Figure 2:
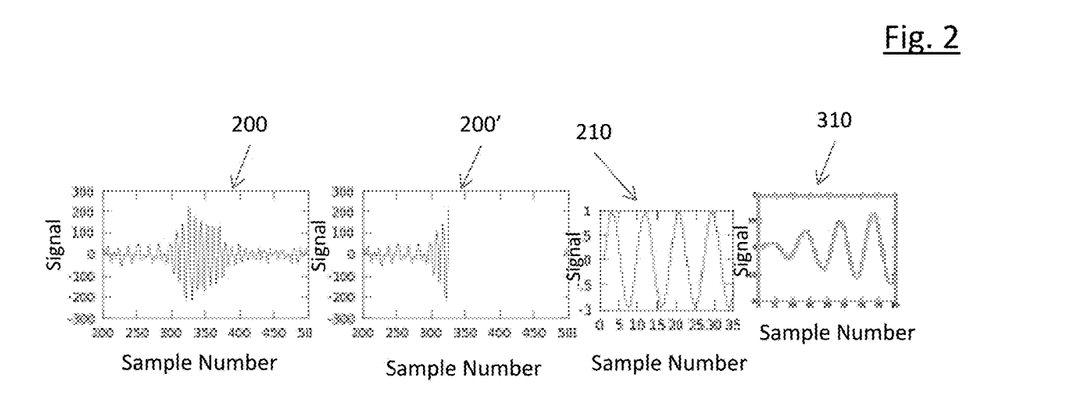
FIG. 2 is a schematic illustration of three waveforms used in a method of using the example probe of FIG. 1.

Meanwhile, in the second transmitter/detector module 30*b*, the switch 70*b* is open. The transducer 40*b* receives the ultrasound pulses generated by the transducer 40*a* of the first transmitter/detector module 30*a*, converting the received ultrasound waveform into an electrical waveform 200 (FIG. 2). The electrical waveform 200 is received by the amplifier 60*b*, which provides an amplified signal Rx, representing the waveform, to the processor 20. The signal Rx is stored by the processor 20 in digital form.

Figure 3:
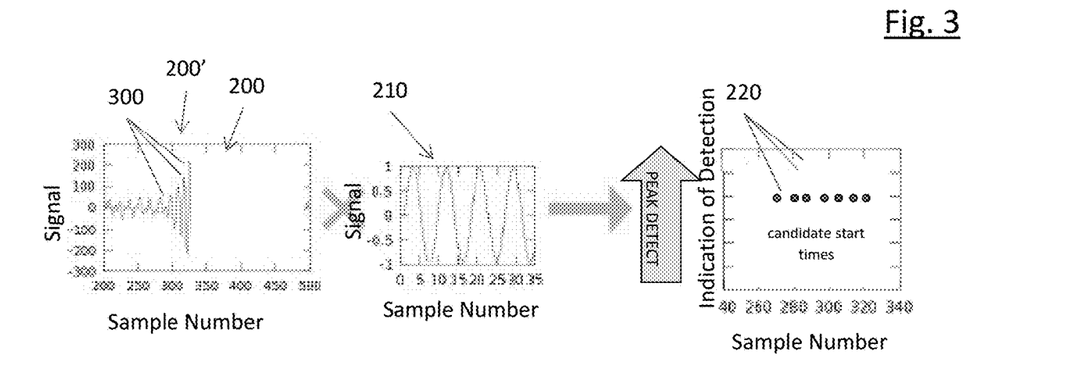
FIG. 3 is a schematic illustration of a first signal-processing step in a method of using the example probe of FIG. 1 (in the third plot of the figure, the x-axis is the number of the correlation and the y-axis is the degree of match at that correlation)
Figure 4:
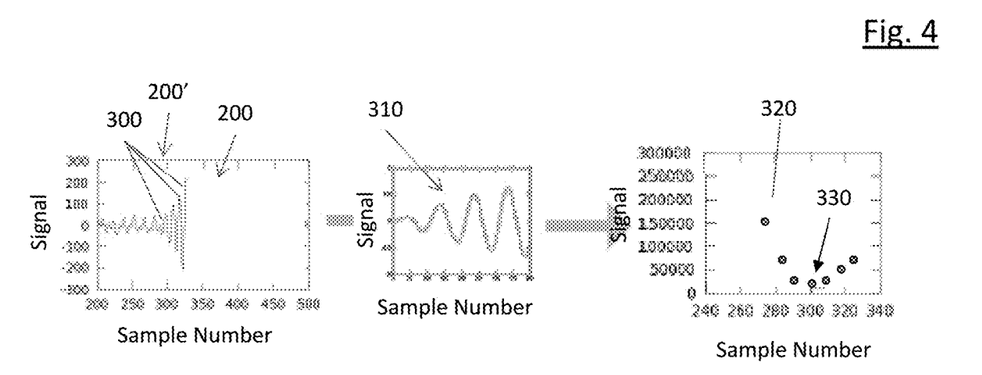
FIG. 4 is a schematic illustration of a second signal-processing step in a method of using the example probe of FIG. 1.

The processor 20 processes the stored digital signals to find an accurate time datum point on the waveform as described with reference to FIGS. 2, 3 and 4 below. (To improve signal-to-noise ratio, the processor 20 could in other embodiments average a plurality of the stored waveforms, corresponding to different pulses from the generated pulse train, to provide a stored average received waveform). After a period of time the roles (and hence operations) of the first and second transmitter/detector modules 30*a,b* are reversed, by switching switches 70*a,b* , so that the transducer 40*b* of the second module 30*b* is driven by the driver 50*b* to generate ultrasonic pulses and the transducer 40*a* of the first module 30*a* provides a signal to the amplifier 60*a* as it detects the generated pulses.

In a method according to an example embodiment of the invention, signal processing carried out to determine the time of flight of the ultrasound pulses is based on waveform shape rather than waveform features. The following principal steps are performed in sequence, to spread the computational load over time and to reduce the amount of computational power needed. The example method described here uses the example apparatus described above, however the skilled person will readily recognise that the method is not limited to use with that apparatus.

Prior to operation, the drive power provided by the drivers 50*a,b* and the analogue gain of the amplifiers 60*a,b* are adjusted until a pre-selected signal-to-noise ratio is exceeded. (The signal-to-noise ratio in the received signal can be reduced by systematic disturbances which include, for example, contamination of the ultrasound transducers 40*a,b*, high stack flow velocity or increased temperature around the transducers 40*a,b*). Thus, in a preliminary step, ultrasonic pulses are transmitted between the transducers 40*a,b*, and the amplitude of the transmitted pulses and the gain applied to the received pulses are adjusted to optimise the signal-to-noise ratio in the transducers 40*a,b*.

As described above, the transducers 40*a,b* are driven with a series of pulses at ultrasonic frequencies, and transmit a train of ultrasonic pulses that are tones at the ultrasound frequency. (As mentioned above, in other embodiments, a train of pulses is transmitted in order to build up a strong waveform 200, i.e. a signal with a high signal-to-noise ratio) with a well-defined and unique peak of the envelope of the waveform 200.) The ultrasonic frequency can be fixed or can be selected dynamically to optimise efficiency in the power transmission/reception cycle of the pair of transducers.

The received electrical waveform 200 starts to build up, with the frequency of the detected ultrasonic pulses that are driving it, and its envelope reaches a peak value then decays. The entire waveform 200 is stored digitally, using analogue-to-digital conversion and memory binning, with a resolution of about 1 microsecond. The time corresponding to the maximum of the envelope of the waveform is determined.

The stored received waveform 200 is cross-correlated (FIG. 3) with a synthetic tone 210 corresponding to the pulse repetition frequency applied by the driver 50*a,b*. The cross-correlation is performed only on the rising (or leading) edge 200' (i.e. the leading part) of the waveform, measured back from the envelope peak by (in this example) 15 wavelengths at a nominal 115 kHz. That ensures that the front of the arriving waveform 200 is included in the correlation, whilst using less computing time than would be required to cross-correlate using the whole waveform 200, by limiting the correlation to the most useful part of the waveform 200. The cross-correlation result exhibits a series of peaks 220 where the synthetic tone 210 and leading edge 200' of the waveform 200 match best, where phase is aligned. The processor 20 carries out peak detection on the cross-correlation result to identify those peaks 220 exceeding a pre-selected value in the cross-correlation. The temporal locations 300 in the received waveform 200 corresponding to those peaks 220 are determined. They are candidates for being the time datum point (arrival time) of the detected pulse, at a coarse resolution of ~1 microsec, with respect to the start of the synthetic tone. (The peaks 220 are in the same temporal locations 300 on the cross-correlation output as they are on the leading part of the waveform; however, the cross-correlation output can start to lose its amplitude on the trailing edge if the receiving transducer is not at the same resonant frequency as the drive frequency.) Note that, unlike prior-art probes, which attempt to use cross-correlation for the entire process of time determination, in this example method cross-correlation is used to find a subset of the peaks in the waveform, and not the precise temporal location of the datum point.

The leading edge 200' of the waveform isolated in the previous step is brought back out of memory and it is compared with a curve template 310 in the form of a synthetic waveform having a specific envelope shape. The template 310 is chosen to suit the quality of the received waveform 200, which varies according to systematic disturbances. A linear template 310 (as shown in FIG. 4) works well in some stack situations but an S-curve template suits more demanding stacks where there is high stack gas velocity, contamination or high temperature. In this example, the method of least squares is used to fit the curve template 310 to the leading edge 200' of the received waveform 200 at the locations 300 corresponding to the set of peaks 220 in the cross-correlation. The comparison is done only at each of the temporal locations 300 selected as candidates in the previous step, which limits the required computing power considerably. Each calculation reveals an error in the fit and so the temporal location is sought which fits best so has the minimum error and therefore is that due to the arrival time of the pulse (FIG. 4). The error curve 320 resulting from the least-squares fit has a minimum error 330, identifying the first peak of the received waveform and thereby the desired time of flight of the pulses. However, the time of flight is determined only to the accuracy of the analogue to digital converter (ADC) used, and it is commercially desirable to use only a low-cost, and hence relatively inaccurate ADC. The resolution remains coarse at ~1 microsec.

Figure 5:
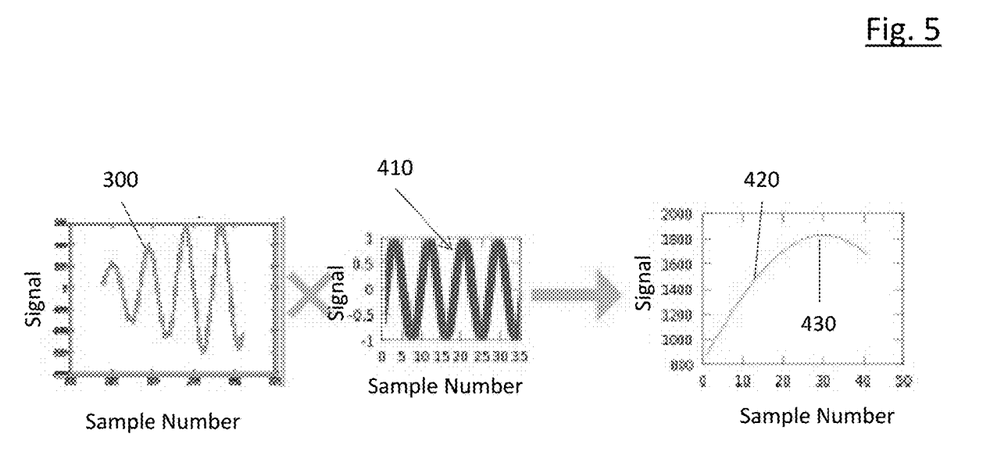
FIG. 5 is a schematic illustration of a third signal-processing step in a method of using the example probe of FIG. 1 (in the third plot of the figure, the x-axis is the number of the correlation and the y-axis is the degree of match at that correlation).

In a further signal-processing step (FIG. 5), another cross-correlation is carried out, to improve the accuracy of the measurement by improving the resolution by cross-correlation between the leading edge 200' of the waveform 200 and tone 210 around the identified temporal point; the native resolution of the waveform remains coarse. A further cross-correlation is performed between the leading edge 200' of the waveform 200 and a synthetic tone but now with fine correlation intervals, well within a cycle; typically, 40 phase shifts of 100 ns each, total 4 microsecs, within one cycle of 10 microseconds.

This second cross-correlation is centered on the temporal location of the minimum error 330 found in the previous step. Within the cross-correlation, the template tone 210 is repeatedly applied with a small phase shift per application (indicated by the broadened set 410 of tone waveforms 210 in FIG. 5). The resulting cross-correlation curve 420 has a clear maximum 430 with a significant improvement in temporal resolution (a factor of 10, for example). The maximum 430 is the accurate temporal point.

Curve 420 is shown as continuous but is a series of points obtained from each template tone 210 of the set 410 (with the x-axis showing the number of cross-correlation phase-shift steps), phase-shifted from its neighbor by an increment which is smaller than the resolution of the ADC and smaller than a single wavelength of the ultrasound. In the present example, the data points in the received waveform are spaced by about 1 microsecond (set by the resolution of the ADC). The data points in the tone are spaced by a chosen amount, in this example about 100 ns. Thus, in the first step of the cross-correlation, the 1st, 11th, 21st, etc. data points in the tone line up with the 1st, 2nd, 3rd, etc. data points in the waveform. On the next step of the correlation, the tone is shifted by one data point, i.e. 100 ns, thus introducing a small phase shift. As a practical measure, in this next step the correlation calculation is done using the 2nd, 12th, 22nd . . . data points of the tone, because they now line up with the 1st, 2nd, 3rd, data points of the waveform. In this example, there are 40 shifts of 100 ns each in the correlation. That is implemented in code by generating a master tone template with data points separated by dt=100 ns (for example) and from that generate a family of tone curves 410 (FIG. 5) where the first curve is made up of data points 1, 11, 21 etc. the 2nd curve is made up of data points 2, 12, 22 etc. Each step of the cross-correlation calculation is carried out on a successive one of those curves, and each calculation gives a point on the curve in the last panel of FIG. 5. The point with the largest value is where the best fit between the waveform and one of the waveforms which are phases shifted versions of the original tone, and that gives the fine position of the time of flight. Unlike prior art methods that attempt to use cross-correlation for the entire process of time determination, example embodiments of the invention utilize the first cross-correlation to find the peaks and the further cross-correlation on only a portion of the waveform to find the precise temporal location of the desired datum point (i.e. the time of flight).

Thus, it will be appreciated that embodiments of the invention can reduce the computational power required to make the desired measurement. A commercially viable resolution can be achieved with the computational power available in an economically-built, robust, industrial instrument.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of measuring time of flight of a pulse of ultrasound in a fluid flow, the pulse having an ultrasonic frequency, the method comprising:
   (1) transmitting the ultrasound pulse across the fluid flow;
   (2) detecting the ultrasound pulse after transmission, the detected pulse being a first waveform comprising a first plurality of data points, generating a cross-correlation between the first waveform and a tone at the ultrasonic frequency, and identifying a plurality of peaks in the cross-correlation;
   (3) fitting a curve template to the first waveform at temporal locations corresponding to the peaks in the cross-correlation and identifying a first temporal location in the first waveform of the minimum error of the fit, the first temporal location being within the temporal locations;
   (4) performing a further cross-correlation between the first waveform and the tone, the further cross-correlation being carried out over only a portion of the first waveform, utilizing at least some of the data points of the first plurality of data points, the portion containing the first temporal location corresponding to the minimum error of the fit; and
   (5) determining a second temporal location in the first waveform corresponding to the maximum of the further cross-correlation and thereby obtaining a measurement of the time of flight of the pulses, the second temporal location being within said portion of the first waveform containing the first temporal location.

2. A method of measuring the flow velocity of a fluid flowing in a conduit, the method comprising:
   (a) transmitting, a first ultrasound pulse across the fluid flow from an upstream position and detecting it at a downstream position;
   (b) transmitting, a second ultrasound pulse across the fluid flow from the downstream position and detecting it at the upstream position;
   (c) obtaining a measurement of the time of flight of the first pulse by steps (2) to (5) of the method according to claim 1;
   (d) obtaining a measurement of the time of flight of the second pulse by steps (2) to (5) of the method according to claim 1; and
   (e) calculating the flow velocity using the measurements of the times of flight of the first and second pulses.

3. A method as claimed in claim 1, in which the curve template is chosen from a set of curve templates in response to environmental disturbances.

4. A method as claimed in claim 3, in which the signal-to-noise ratio of the detected waveform is monitored and, when a pre-determined threshold is not achieved, the template changed automatically for one which provides a higher signal-to-noise ratio.

5. A method as claimed in claim 1, in which the curve template is a sinusoid with an envelope that increases linearly or with an envelope that increases in an S-curve.

6. A method as claimed in claim 2, in which the conduit is a stack.

7. A method as claimed in claim 1, in which the fluid is or includes industrial effluent.

8. A method as claimed in claim 1, in which the shape of the transmitted pulses is changed during the method to optimise transmission and detection characteristics.

9. A method as claimed in claim 1, in which the waveforms from a plurality of the pulses are averaged to build up an average waveform, and the steps of the method are then be carried out on the average waveform.

10. A method as claimed in claim 1, in which the curve-fitting is an Lp-norm curve-fitting process.

11. A method as claimed in claim 1, in which the power of the transmitted pulses is altered automatically in order to match the range of a detector detecting the pulses.

12. A method as claimed in claim 1, in which the pulse repetition frequency of the transmitted pulses is selected dynamically.

13. An ultrasound flow probe for measuring the flow velocity of a fluid flowing in a conduit, the probe comprising:
- (i) a pulse transmitter for transmitting, from an upstream position, across the fluid flow, a first ultrasound pulse, the first ultrasound pulse having an ultrasound frequency;
- (ii) a detector for detecting the first ultrasound pulse at a downstream position, the detected pulse being a first waveform comprising a first plurality of data points;
- (iii) a pulse transmitter for transmitting, from the downstream position, across the fluid flow, a second ultrasound pulse, the second ultrasound pulse having a waveform having an ultrasound frequency and a rising edge;
- (iv) a detector for detecting the second pulse at the upstream position, the detected pulse being a second waveform comprising a second plurality of data points; and
- (v) a processing unit configured to, for the first waveform and second waveform:
  - (A) generate a cross-correlation between the waveform of the detected pulse and a tone at the ultrasonic frequency and identify a plurality of peaks in the cross-correlation;
  - (B) fit a curve template to the waveform at temporal locations corresponding to the peaks in the cross-correlation and identify a first temporal location in the waveform of the minimum error of the fit, the first temporal location being within the temporal locations;
  - (C) perform a further cross-correlation between the waveform and the tone, the further cross-correlation being carried out over only a portion of the waveform, the portion containing the first temporal location corresponding to the minimum error of the fit; and
  - (D) determine a second temporal location in the waveform corresponding to the maximum of the further cross-correlation and thereby obtain a measurement of the time of flight of the pulse, the second temporal location being within said portion of the first waveform containing the first temporal location; and
  - (E) calculate the flow velocity using the measurements of the times of flight of the first and second pulses.

14. A probe as claimed in claim 13, wherein the pulse transmitter for transmitting the first train of ultrasound pulses and the detector for detecting the second train of ultrasound pulses are provided as a common module and/or the pulse transmitter for transmitting the second train of ultrasound pulses and the detector for detecting the first train of ultrasound pulses are provided as a common module.

15. A probe as claimed in claim 13, wherein the pulse transmitter for transmitting the first train of ultrasound pulses and the detector for detecting the second train of ultrasound pulses, and/or the pulse transmitter for transmitting the second train of ultrasound pulses and the detector for detecting the first train of ultrasound pulses, comprise: a transducer for generating and detecting pulses, a driver to drive the transducer to generate the pulses, an amplifier to amplify a detection signal when the transducer detects the pulses, and a switch to switch between pulse generation and pulse detection modes of operation.

16. A stack including a probe as claimed in claim 13.

* * * * *